US006993917B2

United States Patent

Unger et al.

(10) Patent No.: US 6,993,917 B2
(45) Date of Patent: Feb. 7, 2006

(54) COUPLING FOR HEAT TRANSFER MEMBER

(75) Inventors: Reuven Unger, Athens, OH (US); Dong Gon Hwang, Seoul (KR); Woo Suk Chung, Kyunggi-do (KR)

(73) Assignees: LG Electronics Inc., Seoul (KR); Sunpower, Inc., Athens, OH (US)

( * ) Notice: Subject to any disclaimer, the term of this patent is extended or adjusted under 35 U.S.C. 154(b) by 0 days.

(21) Appl. No.: 10/627,714

(22) Filed: Jul. 28, 2003

(65) Prior Publication Data

US 2004/0088999 A1 May 13, 2004

(51) Int. Cl.
*F25B 9/14* (2006.01)

(52) U.S. Cl. ............................................ 62/6; 165/179

(58) Field of Classification Search ...................... 62/6; 228/133, 134, 136; 285/329, 330, 332.4, 285/331, 334; 165/179, 180; 138/38, 142
See application file for complete search history.

(56) References Cited

U.S. PATENT DOCUMENTS 2,488,229 A * 11/1949 Noojin .................... 285/148.9
4,565,383 A * 1/1986 Isaac .......................... 280/276
4,887,853 A * 12/1989 Flowers et al. .......... 285/288.1
5,039,896 A * 8/1991 Adams et al. ................ 310/71
5,333,918 A * 8/1994 Crout et al. ............. 285/288.1
6,161,389 A * 12/2000 Sekiya et al. .................... 62/6
6,293,184 B1 9/2001 Unger
6,327,862 B1 * 12/2001 Hanes ............................ 62/6
6,446,336 B1 9/2002 Unger
6,631,740 B1 * 10/2003 Jackson et al. ............. 138/109
6,732,905 B2 * 5/2004 Humpston et al. ....... 228/124.6

FOREIGN PATENT DOCUMENTS

JP 10-15661 * 1/1998

* cited by examiner

*Primary Examiner*—Cheryl Tyler
*Assistant Examiner*—Richard L. Leung
(74) *Attorney, Agent, or Firm*—Greenblum & Bernstein, P.L.C.

(57) ABSTRACT

A heat transfer member having an external heat transfer member including an insertion hole having an adaptor ring inserted thereinto, and at least one of a base blocking protrusion and a grove blocking protrusion formed on a predetermined portion of the surface of the base confronting the inserted adaptor ring inside the insertion groove, for increasing the coupling strength of the external radiating member and the adaptor ring and the transition member.

18 Claims, 4 Drawing Sheets

COUPLING FOR HEAT TRANSFER MEMBER

CROSS-REFERENCE TO RELATED APPLICATION

The present application is related to Korean Paten Application No. 2002-006326, filed on Feb. 4, 2002

BACKGROUND OF THE INVENTION

1. Field of the Invention

The present invention relates to a heat transfer member, and more particularly, to an external heat transfer member and a transition member having improved coupling strength.

2. Description of the Related Art

Generally, a variety of reciprocating devices, including but not limited to free-piston machines, are often used in a heat regeneration type of refrigerator, including but not limited to Stirling coolers, Gifford-McMahon refrigerators, and the like.

A conventional free-piston machine is described in U.S. Pat. No. 6,293,184, which issued to Unger on Sep. 25, 2001, the contents of which are expressly incorporated by reference in its entirety. Additionally, hereinafter, the structure and operation of a conventional typical free piston machine is described in FIG. 1, which shows a sectional view of a typical free-piston machine.

The free-piston machine includes a sealing container 10, a cylinder 20 installed in the inside of the sealing container 10, for receiving a gas therein, a piston 22 mounted inside of the cylinder 20, a displacer housing 30 provided on one side of the cylinder 20, a displacer 32 movably installed inside the displacer housing 30, for compressing and expanding a gas while moving in combination with the piston 22, a regenerator 40 for absorbing thermal energy from the gas and storing/radiating the thermal energy, and a linear motor 50 for driving the piston 22.

The displacer 32 is configured to have a displacer rod 321 on its one end, which penetrates the piston 22 and is supported by a planar spring 12 on the lower side of the cylinder 20. The planar spring 12 linearly reciprocates within its range of elastic deformation. The displacer 32 is configured to also include the regenerator 40 therein.

A compression space 30*a* is provided between the piston 22 and the displacer 32, for compressing a gas by the combined movement of the piston 22 and the displacer 32. An expansion space 30*b* is provided on the front inner side of a finger tube 14, for expanding a gas.

The free-piston machine also includes a heat transfer member for gradually reducing the energy level of the gas in a cycle including the compression space 30*a* and the expansion space 30*b*, and the regenerator 40 therebetween. In detail, the heat transfer member includes internal/external heat transfer members 17, 18 respectively internally and externally mounted on the transition member 16 which connects a finger tube 14 with the sealing container 10.

Referring to FIGS. 1 and 2, the internal heat transfer member 17 includes a base 171 having a generally tubular shape and attached to the inside wall of the transition member 16, and a plurality of heat-absorbing fins 172 protruding inwardly from the base 171. The external heat transfer member 18 includes a base 181 having a generally tubular shape and adhesively attached with the outer side wall of the transition member 16, and a plurality of heat-absorbing fins 182 protruding outwardly from the base 181.

The base 181 of the external heat transfer member 18 is made bigger in volume than the base 171 of the internal heat transfer member 17 so as to increase the heat transfer effect. In addition, there is provided an air pocket (18*a* in FIG. 3), which is an empty space between the transition member 16 and the external heat transfer member 18, and which does not overlap with the internal heat transfer member 17 and is bigger in diameter than the internal heat transfer member 17.

While the gas compressed in the compression space 30*a* passes through the transition member 16 prior to being introduced into the regenerator 40, it makes contact with the internal heat transfer member 17 and conducts its thermal energy out of the transition member 16 through the external heat transfer member 18. Therefore, the energy level of the gas is gradually lowered, and unnecessary energy loss can be prevented due to the presence of the air pocket 18*a* beyond the location of the internal heat transfer member 17 because the continuous transferring of the heat is stopped.

In order to improve sealing capabilities between respective components during manufacture of the free-piston machine, the front end of the transition member 16, the internal and external heat transfer members 17, 18 and an adaptor ring 19 are coupled by brazing.

Referring to FIG. 3, in the brazing process, a ring-shaped brazing material P is applied to the front end of the external heat transfer member 18, and an induction coil C is mounted on the adaptor ring 19. Then, power is applied to the induction coil C, and each component is heated to melt the brazing material P.

However, in the conventional art, since the transition member 16 and the adaptor ring 19 are made of stainless steel, and the external heat transfer member 18 is made of copper, the melted brazing material P mostly flows toward the external heat transfer member 18, which has a relatively high thermal conductivity because of its material property (i.e. copper). Therefore, the brazing portion of the transition member 16 and the adaptor ring 19 may have an unreasonably weak strength.

In addition, because the base 181 of the external heat transfer member 18 and the transition member 16 have a narrow clearance (about 50 μm), the brazing material P does not flow through the clearance between the adaptor ring 19 and the external heat transfer member 18, and also does not flow through the clearance between the transition member 16 and the external heat transfer member 18. Therefore, the brazing strength between the external heat transfer member 18 and the transition member 16, and the brazing strength between the external heat transfer member 18 and the adaptor ring 19 is not uniform, thereby potentially causing problems with the braze.

Furthermore, in the brazing process, the air is heated inside the air pocket 18*a* and expanded to be introduced into the clearance between the external heat transfer member 18 and the transition member 16 such that the air bubbles are generated in the melted brazing material P, thereby reducing the sealing capabilities thereof.

SUMMARY OF THE INVENTION

Accordingly, the present invention is directed to provide a more firmly structured connection between components by allowing a brazing material to be uniformly introduced between, e.g., a transition member and an external heat transfer member and between an adaptor and an external heat transfer member, and by discharging the air bubbles in an air pocket efficiently and easily, and that substantially obviates one or more problems due to limitations and disadvantages of the related art.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

The present invention provides a heat transfer member for a reciprocating device, the heat transfer member having an internal heat transfer member mounted inside of a transition member, and an external heat transfer member mounted outside of the transition member. The external heat transfer member includes a base and a base blocking protrusion at a region where the transition member and the base make contact. Additionally, the base blocking protrusion may be spaced axially inwardly from one end of the base.

The reciprocating device may be a cooler and have a sealing container, a cylinder provided inside the sealing container and filled with a working gas, a cold finger tube provided at one end of the sealing container, a displacer cylinder provided within the cold finger tube, a displacer configured to divide an inside of the displacer cylinder into an expansion space and a compression space, a piston configured to move together with the displacer within the cylinder, the piston and displacer configured to compress and expand the working gas, a linear motor unit configured to drive the piston, a regenerator configured to at least one of store and radiate thermal energy after absorbing thermal energy from the working gas, wherein the internal heat transfer member connects the cold finger tube and the sealing container.

According to another feature of the invention the external heat transfer member further has an insertion groove configured to accept an adaptor inserted therein, and a groove blocking protrusion provided in the insertion groove.

According to an additional feature of the invention the base may include a stepped portion on an inner circumferential surface of the base that makes contact with the transition.

According to yet another feature of the invention, the base may include a vent hole configured to connect an air pocket on an inside of the base to an area outside the base.

An additional feature provides a heat transfer member for a reciprocating device, the heat transfer member having an internal heat transfer member mounted inside a transition member, and an external heat transfer member mounted outside the transition member and having an insertion groove configured to accept an adaptor ring inserted thereinto, and a groove blocking protrusion extending from a circumferential surface of the insertion groove.

According to still another feature, the groove blocking protrusion is spaced axially inwardly from one end of the base.

According to another feature of the invention, the external heat transfer member further has a base and a base blocking protrusion provided at a portion of the base contacting the transition member.

According to yet another feature, the base includes a stepped portion on an inner circumferential surface of the base that makes contact with the transition member.

According to yet still another feature, the external heat transfer member further has a vent hole configured such that air inside the air pocket formed between the external heat transfer member and the transition member is discharged during a brazing work.

According to a further feature, the groove blocking protrusion may have a flat upper surface and a smooth end surface.

An additional feature of the invention provides a heat transfer member having an internal heat transfer member mounted inside of a transition member and an external heat transfer member mounted on the outside of the transition member, the external heat transfer member having a base and an insertion groove configured to accept an adaptor ring inserted thereinto, a first blocking protrusion formed on the insertion groove, and a second blocking protrusion formed on a surface of the base that contacts the transition.

Also at least one of the first and second blocking protrusions may be spaced axially inwardly from one end of the base.

In another feature of the invention the base has a stepped portion on an inner circumference of the base at a region that contacts the transition member.

According to a further feature, the external heat transfer member has a vent hole configured such that air in an air pocket formed between the external heat transfer member and the transition member is discharged during the brazing work.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings.

In order to increase the efficiency of the brazing process, a reciprocating device of the present invention adopts a configuration in which a stepped portion is provided on a predetermined portion of the inner circumferential surface of a base of an external heat transfer member, that is in contact with a transition member, with a predetermined diameter. A blocking protrusion is provided inwardly from the stepped portion. In addition, another blocking protrusion is provided on the base of the external heat transfer member, on a predetermined portion of the surface contacting with an insertion groove into which an adaptor ring is inserted.

In addition, a vent hole is provided on the external heat transfer member to allow an air pocket to connected to the exterior.

Hereinafter, an embodiment of the present invention is described in detail with reference to FIGS. 4 and 5. Wherever possible, the same reference numbers will be used throughout the drawings to refer to the same or like parts.

Figure 1:
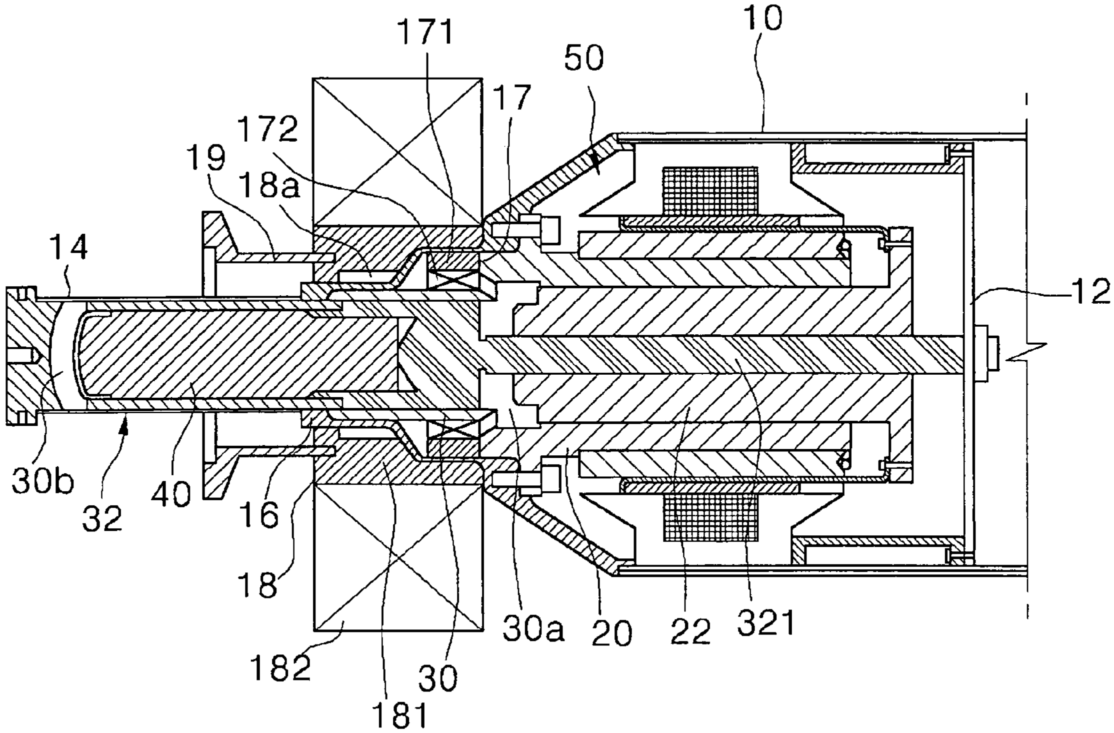
FIG. 1 is a sectional view of a conventional reciprocating device.
Figure 2:
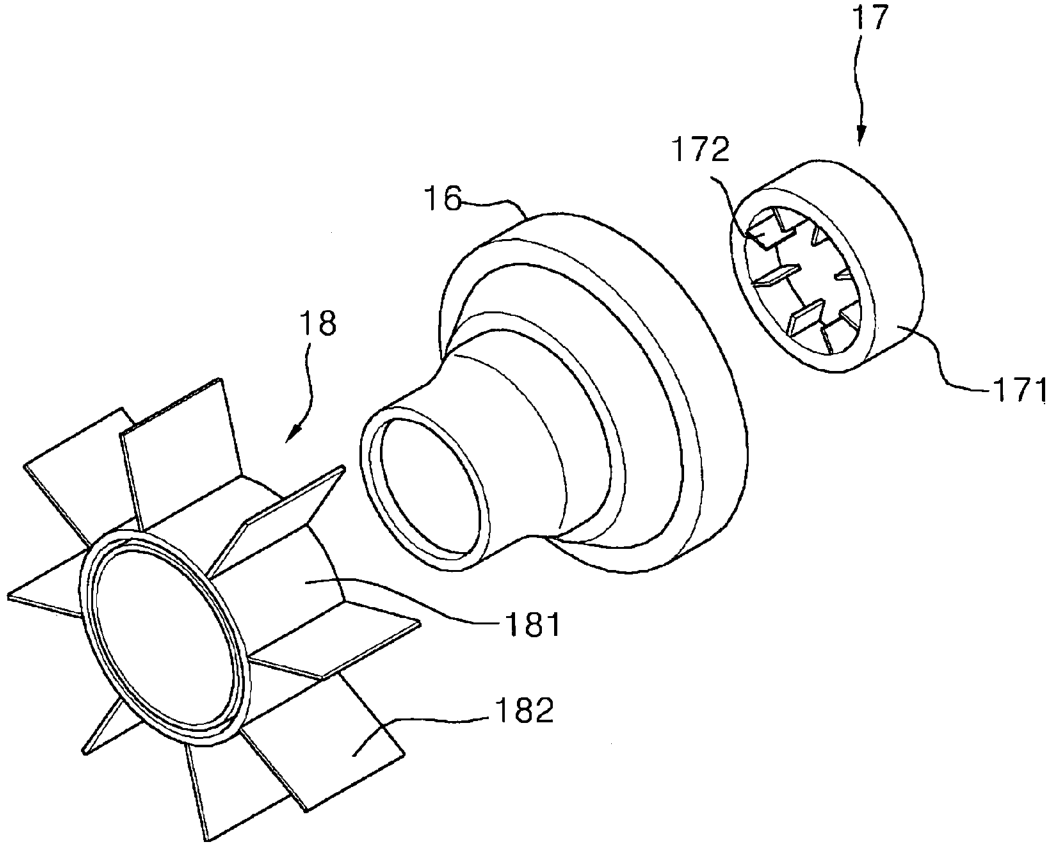
FIG. 2 is an exploded perspective view of a heat transfer member employed by a conventional reciprocating device.
Figure 3:
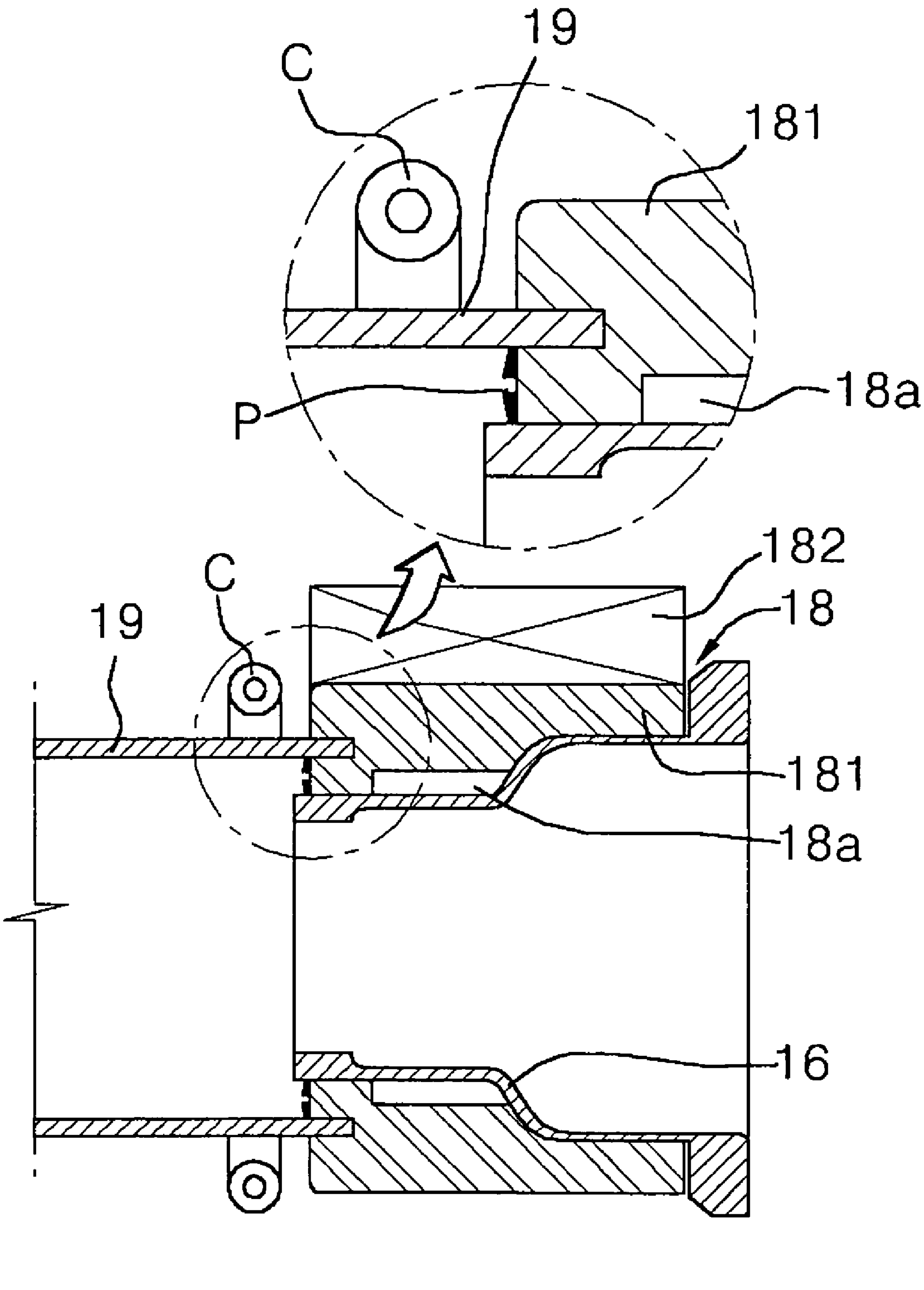
FIG. 3 is a sectional view showing the coupling structure of a transition member and an external heat transfer member in a reciprocating device of the conventional art.
Figure 4:
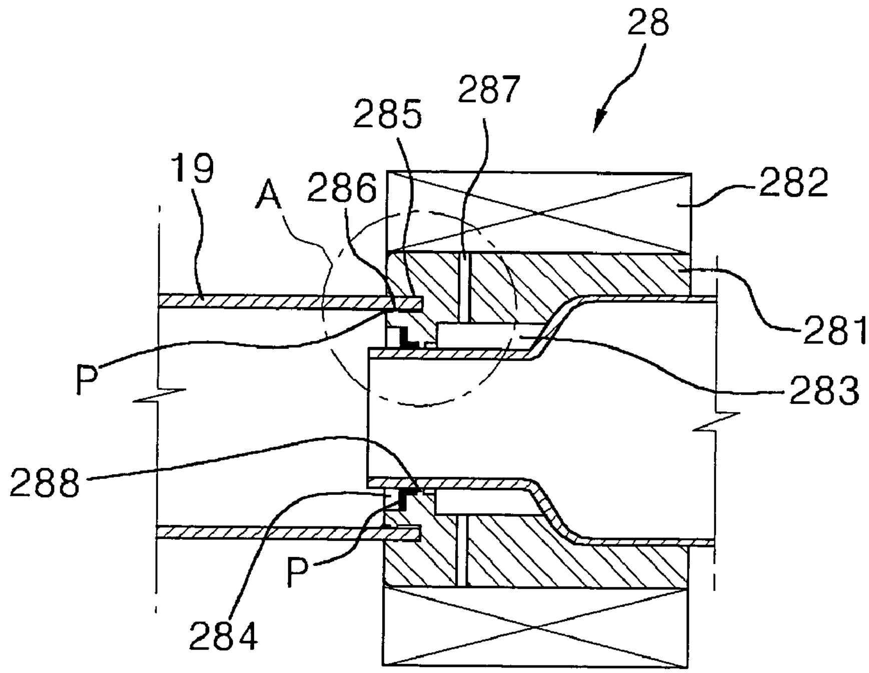
FIG. 4 is a sectional view showing the coupling structure between a transition member and an external heat transfer member, and between an adaptor ring and an external heat transfer member in a reciprocating device according to one embodiment of the present invention.

FIG. 4 is a sectional view of the structure of an external heat transfer member to illustrate an embodiment of the present invention. While this embodiment illustrates a free-piston Stirling engine, it is readily appreciable by those skilled in the art that the present invention is applicable to a wide variety of reciprocating devices.

The reciprocating device according to the embodiment of the present invention further includes an adaptor ring 19, and internal/external heat transfer members 17 (not shown in FIG. 4) and 28 respectively mounted internally and externally on a transition member 16 connected to a sealing container 10 (not shown in FIG. 4). The external heat transfer member 28 includes a base 281 and a conducting fin 282. It is noted that the heat transfer member 28 also performs the functions of radiating heat and conducting heat, depending on the stage of the thermodynamic cycle of the reciprocating device in which the heat transfer member is used.

In particular, in order to make the brazing process more efficient and effective, a stepped portion 284 is formed at a predetermined distance from one end of the base 281 of the external heat transfer member 28. The stepped portion 284 radially and axially inwardly extends from the inner circumferential surface of the base 281, and makes contact with the transition member 16. A blocking protrusion 288 is formed at a region axially spaced from the one end of the base, where the transition member 16 and the base 281 make contact. The blocking protrusion forms an axially extending channel between the base 281 and transition member 16, the channel configured to accept the brazing material P therein to thereby form a stronger braze between external heat transfer member 28 and transition member 16, as a result of the increased surface area of the brazing material P.

In addition, a blocking protrusion 286 is formed at a region axially spaced from the one end of the base, a predetermined portion of the surface of the base 281 projecting into an insertion groove 285 into which the adaptor ring 19 is inserted. The blocking protrusion 286 creates a channel at the region axially spaced from the one end of the base, between the adaptor ring 19 and the base 281. After the brazing work has been performed, the coupling of the adaptor ring 19 and the external heat transfer member 28 becomes much stronger as a result of the increased surface area for the brazing material to contact and bond the adaptor ring 19 and the base 281 of the external heat transfer member. The entire size of the insertion groove 285 is preferably formed to be a little bigger than that of the adaptor ring 19 to ensure a stronger coupling.

Figure 5:
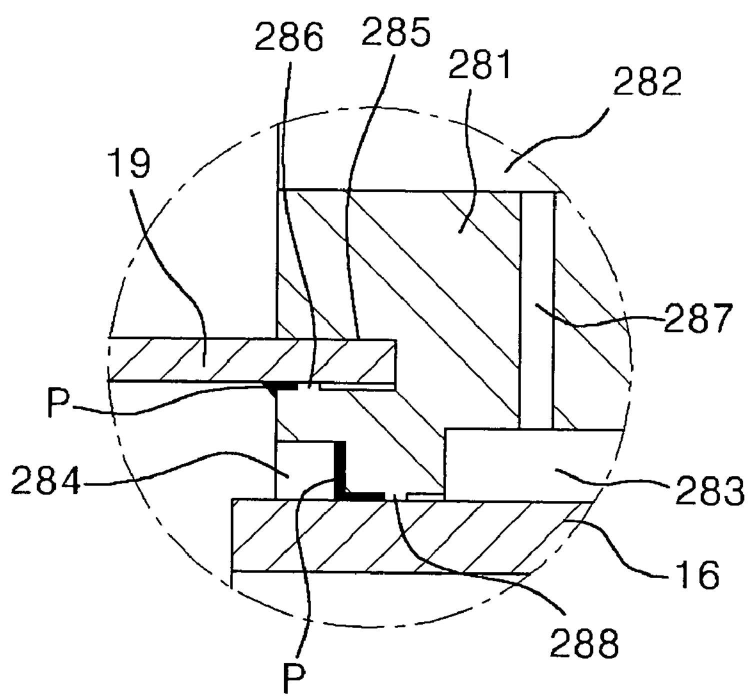
FIG. 5 is an enlarged sectional view of an encircled area "A" of FIG. 4.

The blocking protrusions 286 and 288 are spaced inwardly from one end of the base 281 (i.e., to the right in FIGS. 4–5). The front of the blocking protrusions 286 and 288 is configured to form a protruded surface to allow a brazing material P to be introduced.

That is, a protrusion having a predetermined size is formed in order to allow the brazing material P to be introduced until the flow of material is blocked by the blocking protrusions 286 and 288.

The blocking protrusions 286 and 288 are provided to prevent the brazing material P from seeping further into the respective joint gaps, and to firmly maintain the contact surface.

In addition, a vent hole 287 is provided through the external heat transfer member 28 to communicate an air pocket 283 with the outside or exterior. The vent hole 287 is a through path across the base 281 along the circumferential direction of the base 281, and is provided in a location not to interfere with the conducting fin 282. One or more vent holes 287 are provided to ensure the ventilation of air.

FIG. 5 is an enlarged sectional view of an encircled area "A" of FIG. 4. The brazing material P melted during a brazing process is introduced into the adaptor ring 19 and the transition member 16 via the gap defined by the blocking protrusions 286 and 288 and the stepped portions in the front of the blocking protrusions 286 and 288.

In more detail, the brazing material P is inserted into the gap between the adaptor ring 19 and the insertion groove 285 until it is blocked by the blocking protrusion 286. In addition, the brazing material P is also introduced into the gap between the transition member 16 and the base 281 until it is blocked by the blocking protrusion 288.

Describing the introduction of the brazing material P in detail, the brazing material P is introduced into the gap between the adaptor ring 19 and the insertion groove 285, and the bigger gap between the transition 16 and the base 281. The melted brazing material P is introduced until it is blocked by the blocking protrusions 286 and 288. And, when the brazing material P is hardened to couple the associated components, the coupling strength in a respective contact surface is increased. Since the gap formed between the respective contact surfaces is large enough to allow adequate amount of the brazing material P to be introduced, the coupling strength is increased as the brazing material P becomes hardened. Each end of the blocking protrusions 286, 288 may be flat.

The brazing material P inserted into the contact surface of the transition member 16 and the base 281 is blocked by the blocking protrusion 288 formed on the base 281 from flowing into the air pocket 283.

In addition, the air inside the air pocket 283, which is heated and expanded by the heat applied during the brazing process, is discharged though the vent hole 287 and prevented from flowing into the brazing surface. As a result, the brazing process prevents formation of air bubbles in the melted brazing material P that may reduce sealing capability.

Accordingly, in the present invention, the coupling strength of the components is increased by the improved structure of the external heat transfer member 28, because a brazing material for brazing is applied uniformly in thickness on the contact surfaces between the base 281 of the external heat transfer member 28 and the adaptor ring 19, and between the base 281 of the external heat transfer member 28 and the transition member 16.

In addition, the air heated during the brazing work is easily and fully discharged so that bubbles are not generated in the brazing material, thereby increasing the sealing capability of the reciprocating device of the present invention, and the generation of failures is greatly decreased.

It is noted that the foregoing examples have been provided merely for the purpose of explanation and are in no way to be construed as limiting of the present invention. While the present invention has been described with reference to certain embodiments, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

What is claimed is:

1. A heat transfer member for a reciprocating device, the heat transfer member comprising:

an internal heat transfer member mounted inside of a transition member; and an external heat transfer member mounted outside of the transition member, said external heat transfer member comprising:

a base; and a base blocking protrusion radially extending from the base and configured to contact the transition member, wherein the base blocking protrusion has a flat upper surface and a smooth end surface.

2. The heat transfer member according to claim 1, wherein the base blocking protrusion is spaced axially inwardly from one end of the base and creates an axially extending channel between the transition member and the base, the channel configured to accept a brazing material therein.

3. The heat transfer member according to claim 1, wherein:

the reciprocating device is a cooler and comprises:

a sealing container;

a cylinder provided inside the sealing container and filled with coolant gas;

a cold finger tube provided at one end of the sealing container;

a displacer cylinder provided within the cold finger tube;

a displacer configured to divide an inside of the displacer cylinder into an expansion space and a compression space;

a piston configured to move together with the displacer within the cylinder, the piston and displacer configured to compress and expand the coolant gas;

a linear motor unit configured to drive the piston;

a regenerator configured to at least one of store and radiate thermal energy after absorbing thermal energy from the coolant gas; and the internal heat transfer member connects the cold finger tube and the sealing container.

4. The heat transfer member according to claim 1, wherein the external heat transfer member further comprises an insertion groove configured to accept an adaptor inserted therein; and a groove blocking protrusion axially extending from the insertion groove and configured to contact the adaptor and create an axially extending channel between the adaptor and the base, the groove blocking protrusion having a flat upper surface and a smooth end surface, the channel configured to accept a brazing material therein.

5. The heat transfer member according to claim 1, wherein the base comprises a stepped portion on an inner circumferential surface of the base that makes contact with the transition member, a surface of the stepped portion configured to accept a brazing material thereon.

6. The heat transfer member according to claim 1, wherein the base comprises a vent hole configured to connect an air pocket on an inside of the base to an area outside the base.

7. A heat transfer member for a reciprocating device, the heat transfer member comprising:

an internal heat transfer member mounted inside a transition member; and an external heat transfer member mounted outside the transition member and comprising:

an insertion groove configured to accept an adaptor ring inserted thereinto; and a groove blocking protrusion axially extending from a circumferential surface of the insertion groove and configured to contact the adaptor and create an axially extending channel between the adaptor and the base, the channel configured to accept a brazing material therein, wherein the groove blocking protrusion has a flat upper surface and a smooth end surface.

8. The heat transfer member according to claim 7, wherein the groove blocking protrusion is spaced axially inwardly from one end of the base.

9. The heat transfer member according to claim 7, wherein: the reciprocating device is a cooler and comprises:

a sealing container;

a cylinder provided within the sealing container and filled with a coolant gas; a cold finger tube provided at one end of the sealing container;

a displacer cylinder provided within the cold finger tube;

a displacer configured to divide an inside of the displacer cylinder into an expansion space and a compression space;

a piston configured to move together with the displacer within the cylinder, the piston and displacer configured to compress and expand a coolant gas;

a linear motor configured to drive the piston;

a regenerator configured to at least one of store and radiate thermal energy after absorbing thermal energy from the coolant gas; and the internal heat transfer member connects the cold finger tube and the sealing container.

10. The heat transfer member according to claim 7, wherein the external heat transfer member further comprises:

a base; and a base blocking protrusion radially extending from the base and configured to contact the transition member.

11. The heat transfer member according to claim 10, wherein the base blocking protrusion is spaced axially inwardly from one end of the base and creates an axially extending channel between the transition member and the base, the channel configured to accept a brazing material therein.

12. The heat transfer member according to claim 10, wherein the base comprises a stepped portion on an inner circumferential surface of the base that makes contact with the transition member, a surface of the stepped portion configured to accept a brazing material thereon.

13. The heat transfer member according to claim 7, wherein the external heat transfer member further comprises a vent hole configured such that air inside the air pocket formed between the external heat transfer member and the transition member is discharged during a brazing process.

14. A heat transfer member for a reciprocating device, the heat transfer member comprising:

an internal heat transfer member mounted inside of a transition member; and an external heat transfer member mounted on the outside of the transition member and comprising:

a base;

an insertion groove configured to accept an adaptor ring inserted thereinto;

a first blocking protrusion formed on the insertion groove; and a second blocking protrusion formed on a surface of the base that contacts the transition member, wherein the first blocking protrusion has a flat upper surface and a smooth end surface.

15. The heat transfer member according to claim 14, wherein at least one of the first and second blocking protrusions is spaced axially inwardly from one end of the base.

16. The heat transfer member according to claim 14, wherein:

the reciprocating device is a cooler and comprises:

a sealing container;

a cylinder provided within of the sealing container and filled with a coolant gas;

a cold finger tube provided at one end of the sealing container;

a displacer cylinder provided within of the cold finger tube;

a displacer configured to divide an inside of the displacer cylinder into an expansion space and a compression space;

a piston configured to move in combination with the displacer inside the cylinder, the piston and the displacer configured to compress and expand the coolant gas;

a linear motor unit configured to drive the piston;

a regenerator configured to at least one of store and radiate thermal energy after absorbing thermal energy from the coolant gas; and the internal heat transfer member connects the cold finger tube and the sealing container.

17. The heat transfer member according to claim 14, wherein the base comprises a stepped portion on an inner circumference of the base at a region that contacts the transition member.

18. The heat transfer member according to claim 14, wherein the external heat transfer member comprises a vent hole configured such that air in an air pocket formed between the external heat transfer member and the transition member is discharged during a brazing process.

* * * * *